United States Patent
Malloy, III et al.

(10) Patent No.: US 10,720,248 B2
(45) Date of Patent: Jul. 21, 2020

(54) PASSIVE TECHNIQUES FOR LONG-TERM REACTOR COOLING

(71) Applicant: BWXT mPower, Inc., Charlotte, NC (US)

(72) Inventors: John D. Malloy, III, Goode, VA (US); Billy E. Bingham, Lynchburg, VA (US); Ronald C. Watson, Forest, VA (US); Jason G. Williams, Concord, VA (US); Matthew W. Ales, Issaquah, WA (US); James B. Inman, Forest, VA (US); Sean M. Boyle, Charlotte, NC (US)

(73) Assignee: BWXT mPower, Inc., Charlotte, NC (US)

( * ) Notice: Subject to any disclaimer, the term of this patent is extended or adjusted under 35 U.S.C. 154(b) by 1804 days.

(21) Appl. No.: 14/215,530

(22) Filed: Mar. 17, 2014

(65) Prior Publication Data

US 2020/0203029 A1 Jun. 25, 2020

Related U.S. Application Data

(60) Provisional application No. 61/794,206, filed on Mar. 15, 2013.

(51) Int. Cl.
*G21C 15/18* (2006.01)
*G21C 1/32* (2006.01)
*G21C 15/26* (2006.01)

(52) U.S. Cl.
CPC .............. *G21C 15/18* (2013.01); *G21C 1/32* (2013.01); *G21C 1/322* (2013.01); *G21C 15/26* (2013.01)

(58) Field of Classification Search
CPC .......... G21C 15/18; G21C 15/26; G21C 1/32; G21C 1/322; G21C 1/326
See application file for complete search history.

(56) References Cited

U.S. PATENT DOCUMENTS 3,312,596 A * 4/1967 Grain ................ G21C 1/09
376/283
3,649,451 A   3/1972 Yedidia et al.
(Continued)

FOREIGN PATENT DOCUMENTS

CN    101847451 A    9/2010
CN    102903404 A    1/2013
(Continued)

OTHER PUBLICATIONS

The International Search Report and the Written Opinion for PCT/US2014/030393 dated Jan. 7, 2015.
(Continued)

*Primary Examiner* — Sharon M Davis
(74) *Attorney, Agent, or Firm* — Nelson Mullins Riley & Scarborough LLP

(57) ABSTRACT

In a pressurized water reactor (PWR), emergency core cooling (ECC) responds to depressurization due to a vessel penetration break at the top of the pressure vessel by draining water from a body of water through an injection line into the pressure vessel. A barrier operates concurrently with the ECC to suppress flow of liquid water from the pressure vessel out the vessel penetration break. The barrier may comprise one or more of: (1) an injection line extension passing through the central riser to drain water into the central riser; (2) openings in a lower portion of a central riser to shunt some upward flow from the central riser into a lower portion of the downcomer annulus; and (3) a surge line providing fluid communication between a pressurizer volume at the top of the pressure vessel and the remainder of the pressure vessel which directs water outboard toward the downcomer annulus.

7 Claims, 4 Drawing Sheets

(56) References Cited

U.S. PATENT DOCUMENTS

| | | | |
|---|---|---|---|
| 4,064,392 A | 12/1977 | Desalu | |
| 4,421,716 A | 12/1983 | Hench et al. | |
| 4,473,528 A | 9/1984 | Kleimola | |
| 4,576,782 A | 3/1986 | Loose | |
| 4,587,079 A | 5/1986 | Fajeau et al. | |
| 4,692,297 A | 9/1987 | Schlonski et al. | |
| 4,753,771 A | 6/1988 | Conway et al. | |
| 4,897,240 A | 1/1990 | Sako | |
| 4,927,596 A | 5/1990 | Minnick | |
| 4,972,596 A | 5/1990 | Minnick | |
| 4,986,956 A | 1/1991 | Garabedian | |
| 5,000,907 A | 3/1991 | Chevereau et al. | |
| 5,011,652 A | 4/1991 | Tominaga et al. | |
| 5,045,274 A | 9/1991 | Donaldson | |
| 5,049,353 A | 9/1991 | Conway et al. | |
| 5,075,070 A | 12/1991 | Costes | |
| 5,085,825 A | 2/1992 | Gluntz et al. | |
| 5,087,408 A | 2/1992 | Tominaga et al. | |
| 5,102,616 A | 4/1992 | Gardner et al. | |
| 5,106,571 A | 4/1992 | Wade et al. | |
| 5,180,543 A * | 1/1993 | Conway | G21C 15/18 |
| | | | 376/282 |
| 5,202,083 A | 4/1993 | Spinks et al. | |
| 5,259,008 A * | 11/1993 | Schulz | G21C 9/004 |
| | | | 376/283 |
| 5,268,943 A | 12/1993 | Corletti et al. | |
| 5,276,720 A | 1/1994 | Oosterkamp et al. | |
| 5,282,230 A | 1/1994 | Billig et al. | |
| 5,295,168 A | 3/1994 | Gluntz et al. | |
| 5,301,216 A | 4/1994 | Klapdor et al. | |
| 5,349,617 A | 9/1994 | Gautier | |
| 5,517,538 A | 5/1996 | Seidelberger et al. | |
| 5,661,770 A | 8/1997 | Spinks | |
| 5,694,442 A | 12/1997 | Cinotti et al. | |
| 5,887,043 A | 3/1999 | Spinks | |
| 6,795,518 B1 | 9/2004 | Conway et al. | |
| 7,154,982 B2 | 12/2006 | Gautier et al. | |
| 8,170,173 B2 | 5/2012 | Reyes, Jr. et al. | |
| 9,761,334 B2 | 9/2017 | Kim et al. | |
| 9,859,027 B2 | 1/2018 | Kim et al. | |
| 2004/0196948 A1 | 10/2004 | Conway et al. | |
| 2009/0120511 A1 | 5/2009 | Weingarten | |
| 2009/0129530 A1 | 5/2009 | Reyes, Jr. et al. | |
| 2009/0129531 A1 | 5/2009 | Reyes, Jr. et al. | |
| 2009/0279657 A1 | 11/2009 | Kwon et al. | |
| 2010/0278294 A1 | 11/2010 | Kwon et al. | |
| 2011/0197976 A1 | 8/2011 | Weingarten | |
| 2012/0177168 A1 | 7/2012 | Reyes, Jr. et al. | |
| 2012/0207260 A1 | 8/2012 | Houghton et al. | |
| 2012/0243651 A1 | 9/2012 | Malloy | |
| 2012/0294408 A1 | 11/2012 | Reyes, Jr. et al. | |
| 2012/0321030 A1 | 12/2012 | Malloy et al. | |
| 2013/0308740 A1 * | 11/2013 | Fatih | G21C 1/09 |
| | | | 376/395 |
| 2013/0336440 A1 | 12/2013 | Memmott et al. | |
| 2013/0336441 A1 | 12/2013 | Cronje et al. | |
| 2014/0016734 A1 | 1/2014 | Moon et al. | |
| 2014/0050292 A1 | 2/2014 | Kim et al. | |

FOREIGN PATENT DOCUMENTS

| | | |
|---|---|---|
| DE | 3138907 C1 | 2/1983 |
| EP | 2096644 A2 | 9/2009 |
| JP | S50-104098 U | 8/1975 |
| JP | S52-104122 A | 9/1977 |
| JP | H0-1311294 A | 12/1989 |
| JP | H03502005 A | 5/1991 |
| JP | H0-8201559 A | 8/1996 |
| JP | H0-9506429 A | 6/1997 |
| JP | 2001183487 A | 7/2001 |
| JP | 2005-510744 A | 4/2005 |
| JP | 2012-509465 A | 4/2012 |
| KR | 100856501 B1 | 9/2008 |
| WO | 2012158459 A1 | 11/2012 |
| WO | 2013/095741 A2 | 6/2013 |
| WO | 2014/163866 A1 | 10/2014 |
| WO | 2014/200600 A2 | 12/2014 |

OTHER PUBLICATIONS

Office Action, European Application No. 14810719.6, dated Nov. 6, 2017, 4 pages.

Castleberry, G. "Babcock & Wilcox Pressurized Water Reactors," 35 pages (2012) Available online: <http://pdhonline.org/courses/e183/e183content.pdf.

Extended European Search Report, EP Application No. 14779191.7., dated Jan. 2, 2017, 8 pages.

Extended European Search Report, EP Application No. 14810719, dated Nov. 15, 2016, 7 pages.

International Preliminary Report on Patentability, PCT/US2014/18268, dated Sep. 15, 2015, 9 pages.

International Preliminary Report on Patentability, PCT/US2014/30393, dated Oct. 20, 2015, 6 pages.

International Search Report and Written Opinion, PCT/US2014/18268, dated Jun. 6, 2014, 10 pages.

Office Action with English translation issued in corresponding Chinese Applicaiton No. 201480022027.9 dated Oct. 24, 2016, 18 pages.

Office Action with English translation issued in corresponding Japanese Applicaiton No. 2016-503391 dated Jan. 25, 2018, 8 pages.

* cited by examiner

PASSIVE TECHNIQUES FOR LONG-TERM REACTOR COOLING

This application claims the benefit of U.S. Provisional Application No. 61/794,206 filed Mar. 15, 2013 and titled "PASSIVE TECHNIQUES FOR LONG-TERM REACTOR COOLING". U.S. Provisional Application No. 61/794,206 filed Mar. 15, 2013 and titled "PASSIVE TECHNIQUES FOR LONG-TERM REACTOR COOLING" is hereby incorporated by reference in its entirety into the specification of this application.

This invention was made with Government support under Contract No. DE-NE0000583 awarded by the Department of Energy. The Government has certain rights in this invention.

BACKGROUND

The following relates to the nuclear power generation arts, nuclear reactor safety arts, nuclear reactor emergency core cooling (ECC) arts, and related arts.

In a loss of coolant accident (LOCA), the nuclear reactor core is to be kept immersed in water so as to provide for removal of decay heat and to prevent exposure of the fuel rods to air which can lead to chemical reactions and release of airborne radioactivity. The system which provides this water injection is referred to as the emergency core cooling (ECC) system. In a typical arrangement, a refueling water storage tank (RWST) is located with the nuclear reactor inside radiological containment to provide water for use during reactor refueling, and this RWST also serves as a water source for the ECC system. The RWST is located above the reactor core so that the passive ECC system can operate by gravity-driven water flow.

Water injected into the depressurized pressure vessel by the ECC system is converted to steam by decay heat from the nuclear reactor core. Preferably, this steam is recaptured by condensing it into the RWST so as to form a closed-loop recirculating heat exchange system. In practice, some steam is lost from the break that caused the LOCA. This lost steam condenses inside the surrounding radiological containment, thereby contributing to heat transfer from the reactor core although not in a recirculating fashion. In some embodiments, the water collects in a containment sump, and a sump pump is provided to recirculate the water back into the RWST. However, this approach is susceptible to failure if the diesel generators or other power source driving the sump pump fail, and moreover there is the potential to transfer contamination into the RWST that can interfere with operation of the ECC system.

BRIEF SUMMARY

In one disclosed aspect, an apparatus comprises: a pressurized water reactor (PWR) comprising a pressure vessel containing a nuclear reactor core comprising fissile material; a radiological containment structure inside of which the PWR is disposed; an emergency core cooling system configured to respond to a vessel penetration break at the top of the pressure vessel that results in depressurization of the pressure vessel by draining water from a body of water through an injection line into the pressure vessel; and a barrier configured to operate concurrently with the emergency core cooling system to suppress flow of liquid water from the pressure vessel out the vessel penetration break at the top of the pressure vessel. The barrier may comprise one or more of: (1) an extension of the injection line disposed inside the pressure vessel and passing through the central riser to drain water from the body of water into the central riser of the pressure vessel; (2) openings in a lower portion of a central riser arranged to shunt a portion of the upward flow in the central riser into a lower portion of the downcomer annulus; and (3) a surge line configured to provide fluid communication between a pressurizer volume at the top of the pressure vessel and the remainder of the pressure vessel, the surge line configured to direct water outboard toward a downcomer annulus.

In another disclosed aspect, a method comprises operating a pressurized water reactor (PWR) comprising a pressure vessel containing a nuclear reactor core comprising fissile material, and responding to a vessel penetration break at the top of the pressure vessel that results in depressurization of the pressure vessel by operations including: draining water from a body of water through an injection line into the pressure vessel; and during the draining, suppressing flow of liquid water from the pressure vessel out the vessel penetration break. The suppressing may include generating a counterflow in the pressure vessel during the draining in a direction opposite a flow of coolant water in the pressure vessel during the operating, for example by injecting the water from the body of water into the central riser. The suppressing additionally or alternatively may comprise shunting a portion of the upward flow of coolant water in the central riser through holes in the central riser and into a lower portion of the downcomer annulus without the shunted water reaching a top of the central riser. The suppressing additionally or alternatively may comprise directing surge flow between a pressurizer volume and the remainder volume of the pressure vessel outboard toward a downcomer annulus.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention. This disclosure includes the following drawings.

DETAILED DESCRIPTION OF THE PREFERRED EMBODIMENTS

Figure 1:
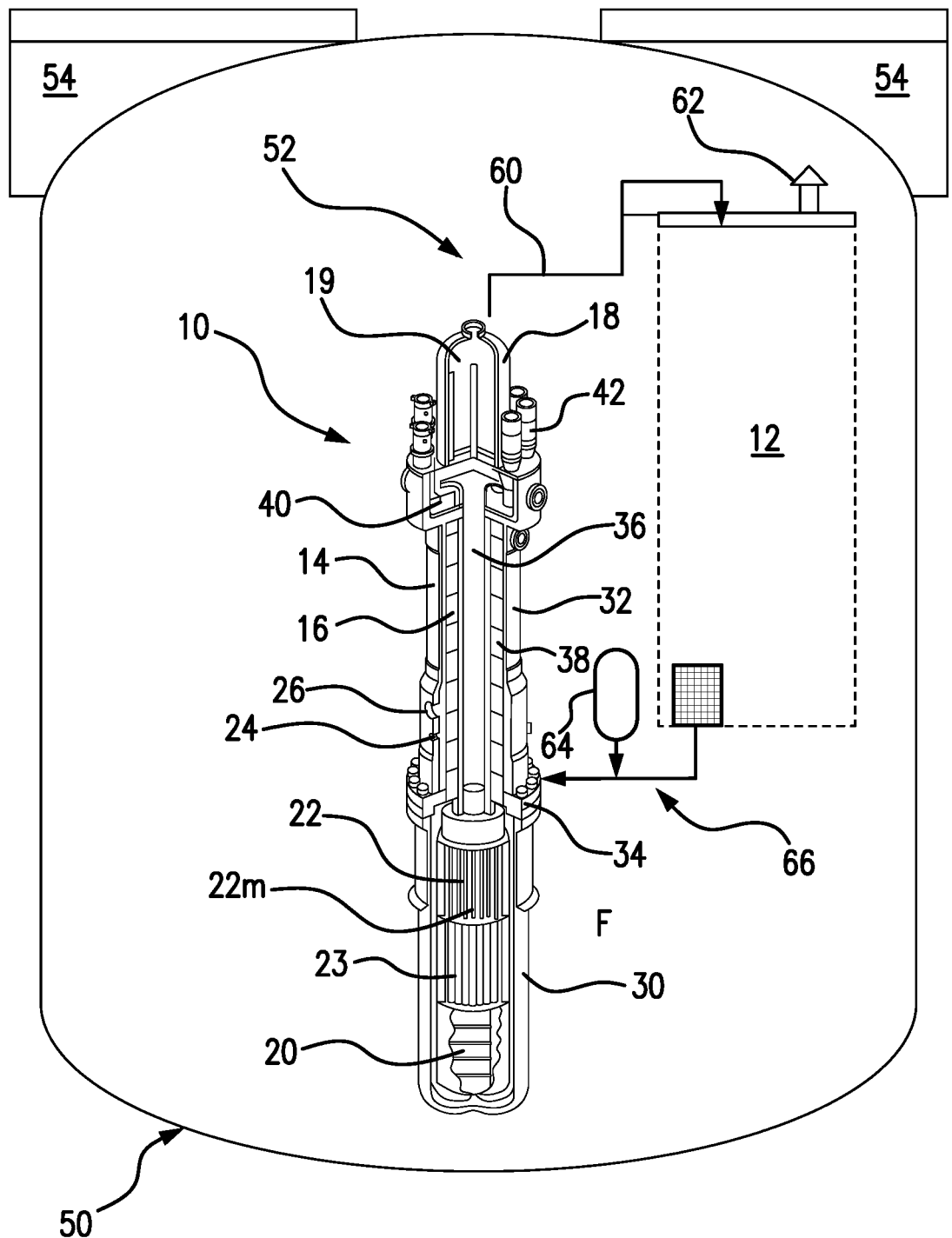
FIG. 1 shows a diagrammatic cutaway perspective view of an illustrative small modular reactor (SMR) disposed in a radiological containment structure along with a refueling water storage tank (RWST) with an emergency core cooling (ECC) system utilizing the RWST, and further including a diagrammatically indicated mechanism for suppressing loss of liquid water through a LOCA break.

With reference to FIG. 1, a cutaway perspective view is shown of an illustrative small modular reactor (SMR) 10 and an illustrative refueling water storage tank (RWST) 12 (typically, two or more RWSTs are provided for redundancy). The SMR unit 10 is of the pressurized water reactor (PWR) variety, and includes a pressure vessel 14 and one or more integral steam generators 16 disposed inside the pressure vessel 14 (that is, the illustrative SMR 10 is an integral PWR 10). Alternatively, an external steam generator may be employed. The SMR 10 also includes an integral pressurizer 18 defining an integral pressurizer volume 19 at the top of the pressure vessel 14; alternatively, an external pressurizer may be employed that is connected at the top of the SMR 10 by suitable piping. The pressure vessel 14 contains a nuclear reactor core 20 comprising fissile material such as $^{235}$U (typically in an alloy, composite, mixture, or other form) immersed in (primary) coolant water (more generally herein, simply "coolant" or "coolant water"). With the reactor core 20 immersed in coolant water, and when control rod drive mechanisms (CRDMs) 22 at least partially withdraw control rods made of neutron-absorbing material, a nuclear chain reaction is initiated in the nuclear reactor core 20 which heats the (primary) coolant water. The illustrative CRDMs 22 are internal CRDMs, in which the CRDM unit including its motor 22$m$ including both rotor and stator are disposed inside the pressure vessel 14, and guide frame supports 23 guide the portions of the control rods located above the core; in other embodiments, external CRDM units may be employed. In the illustrative integral PWR 10, a separate water flow (secondary coolant) enters and exits the steam generators 16 via feedwater inlet 24 and steam outlets 26, respectively. The secondary coolant flows through secondary coolant channels of the steam generator or generators 16, and is converted to steam by heat from the reactor core carried by the (primary) coolant water. Alternatively, if an external steam generator is employed then large-diameter closed-loop piping feeds (primary) coolant water from the pressure vessel to the external steam generator where heat from the primary coolant converts secondary coolant flow in the external steam generator to steam. The pressure vessel 14 of the illustrative integral PWR 10 includes a lower portion 30 housing the nuclear reactor core 20 and an upper portion 32 housing the steam generators 16, with a mid-flange 34 connecting the upper and lower portions of the pressure vessel; however, the pressure vessel may be otherwise constructed or otherwise configured.

A primary coolant flow circuit F inside the pressure vessel 14 is defined by a cylindrical central riser 36 extending upward above the reactor core 20 and a downcomer annulus 38 defined between the central cylindrical riser 36 and the pressure vessel 14. The flow F may be driven by natural circulation (i.e. by primary coolant heated by the reactor core 20 rising through the central cylindrical riser 36, discharging at the top and flowing downward through the downcomer annulus 38), or may be assisted or driven by reactor coolant pumps (RCPs), such as illustrative RCPs including RCP casings 40 containing impellers driven by RCP motors 42. The RCPs may alternatively be located elsewhere along the primary coolant path, or omitted entirely in a natural circulation reactor. It is again noted that the illustrative SMR 10 is merely an illustrative example, and the disclosed ECC techniques are suitably employed with substantially any type of light water nuclear reactor.

With continuing reference to FIG. 1, a diagrammatic sectional view is shown of the SMR 10 disposed in a radiological containment structure 50 (also referred to herein as "radiological containment" or simply "containment") along with the refueling water storage tank (RWST) 12. While a single RWST 12 is illustrated, it is to be understood that two or more RWSTs may be disposed inside containment to provide redundancy and/or to provide a larger total volume of water. The RWST 12 serves multiple purposes. As the name implies, is provides water for use during routine refueling (that is, removal of spent fuel comprising the nuclear reactor core and its replacement with fresh fuel). The RWST 12 also serves as a water reserve for use during certain accident scenarios, such as a loss of heat sinking event in which the heat sinking via the steam generators 16 or other heat sinking pathway is interrupted causing the pressure and temperature in the reactor pressure vessel 14 to rise; or a loss of coolant accident (LOCA) in which a break occurs in a (relatively large-diameter) pipe or vessel penetration connected with the pressure vessel 14.

FIG. 1 diagrammatically illustrates the response to a LOCA comprising a break from which steam 52 (possibly in the form of a two-phase steam/water mixture 52) escapes. In FIG. 1 such a LOCA is diagrammatically indicated as originating in the proximity of the integral pressurizer 18 at the top of the pressure vessel 14. In some embodiments the SMR 10 is designed to eliminate the possibility of a LOCA break occurring at an elevation equal to or lower than the top of the reactor core 20. This can be done by designing the pressure vessel 14 with all large-diameter vessel penetrations located above the top of the reactor core 20 (e.g., the steam generator couplings 24, 26 are so located in the embodiment of FIG. 1). As used herein, "large diameter" vessel penetrations are defined as vessel penetrations of diameter 1.8-inch or larger. Additionally or alternatively, passive integral isolation valves may be employed for large-diameter vessel penetrations, so that any pipe breakage at the vessel penetration is immediately and passively sealed by the integral isolation valve. For example, in the case of a make-up line or other water input line, the passive integral isolation valve may be constructed as a check valve built into the mounting flange (rather than in or connected by external piping that is susceptible to breakage) that operates passively to prevent outflow of coolant from the flange having the integral valve. In the case of a letdown line, the passive integral isolation valve can be constructed with a spring bias that maintains the valve in the open position against the pressure of fluid flowing out via the letdown line, with the spring bias chosen such that an increase in (differential) outward pressure above a threshold value overcomes the spring bias to passively close the valve. Again, the integral isolation valve is preferably built into the mounting flange.

With such measures, it can be ensured that any LOCA break occurs at an elevation well above the top of the reactor core 20. In the illustrative pressure vessel 14, the only large-diameter vessel penetrations susceptible to a break constituting a LOCA are located at the integral pressurizer 18 at the top of the pressure vessel 14. In such a LOCA, the steam/water 52 that escapes from the integral pressurizer 18 of the pressure vessel 14 is contained by the radiological containment 50, and the released energy is ejected to an ultimate heat sink (UHS) 54 via a suitable transfer mechanism. In illustrative FIG. 1, this heat transfer is achieved (at least in part) by direct thermal contact between the UHS 54 which comprises a large body of water located on top of and in thermal contact with the top of the containment 50. Additionally, a passive emergency core cooling (ECC) is activated, which depressurizes the reactor 10 using valves connected to the pressurizer 18 (in the illustrative example of FIG. 1, or elsewhere in other reactor designs) to vent the pressure vessel 14 to the RWST 12. This operation is diagrammatically indicated by steam path 60 carrying steam (or two-phase steam/water mixture) from the pressurizer 18 to be re-condensed in the RWST 12. Any excess pressure in the RWST 12 resulting from the venting of the pressure vessel to the RWST escapes via a steam vent 62 from the RWST. While depressurizing the reactor, water is initially injected into the reactor vessel from two (for redundancy, or more than two for further redundancy) nitrogen pressurized intermediate pressure injection tanks (IPIT, of which one illustrative IPIT 64 is shown in FIG. 1) to assure the reactor core 20 remains immersed in coolant water during the depressurization. The water in the IPIT 64 optionally includes boron or another neutron poison to facilitate rapid shutdown of the nuclear chain reaction. Once the reactor 10 is depressurized, water in the RWST 12 (or RWSTs, if two or more redundant RWST units are provided inside containment) drains into the reactor vessel 14 via an injection line 66 running from the RWST 12 to the reactor pressure vessel, thus refilling the vessel 14. (Note that in illustrative FIG. 1, a downstream portion of the injection line 66 also provides the input path for water from the IPIT 64, in which case suitable valving is provided to valve off the IPIT 64 after initial depressurization is complete. The valving is optionally passive, e.g. automatically closing when the pressure in the pressure vessel 14 falls below a setpoint. It is also contemplated to connect the IPIT with the reactor pressure vessel via a separate line from the injection line 66.) The water in the RWST(s) 12 provides long-term cooling for the reactor core 20.

The RWST 12 is a large body of water conveniently located inside the radiological containment structure 50 and hence is an attractive body of water for use by the ECC system; however, it is alternatively contemplated to connect the injection line 66 to another suitably large body of water that is located at an elevated position respective to the reactor core 20 so as to be drained into the pressure vessel 14 so as to provide emergency core cooling (ECC).

During the depressurization, it is expected that substantial primary coolant in the form of steam will exit the pressure vessel 14 via the break that caused the LOCA. After startup of the ECC system, it is expected that steam will continue to exit the pressure vessel 14 via the break, albeit at a lower mass flow rate than during the initial depressurization. In some embodiments the volume capacity of the RWST(s) 12 is designed to be sufficient to remove decay heat for a design time interval, e.g. 72 hours in some embodiments, or 14 days in other embodiments, without the need to recirculate water from a containment sump using sump pumps. This avoids the potential for transferring contaminants from the sump into the RWST.

Because the ECC system relies upon gravity feed of water from the RWST 12 into the pressure vessel 14, it is necessary for the water level in the RWST 12 to be higher than the water level in the pressure vessel 14 in order for the ECC to operate. In some embodiments, the initial water level in the RWST 12 is higher than the top of the pressure vessel 14—in such embodiments, it is expected that the water level in the reactor vessel 14 will rise to the top of the pressurizer 18 and liquid water will flow out through the LOCA break. However, once the water level in the RWST 12 drops below the top of the pressurizer 18, it might be expected that the flow out of the break would transition from mostly water to essentially all steam. This transition allows efficient utilization of the RWST water inventory. Since the heat capacity of the water then includes the latent heat for converting the water to steam.

However, RELAP (Reactor Excursion and Leak Analysis Program) analysis of long-term cooling indicates that this is not necessarily the case; rather, a two-phase steam/water mixture with substantial water content continues to leave the LOCA break even after the water level in the RWST 12 has drained below the level of the LOCA break. Without being limited to any particular theory of operation, it is believed that this effect is caused as follows. Decay heat from the reactor core 20 generates steam that reduces the density of the water above the reactor core 20. This effect prevents an equilibrium from being established between the water/steam column in the reactor vessel 14 and the water column in the RWST 12. The higher RWST driving head therefore continues to force water out of the break.

The magnitude of the problem is illustrated by a simple calculation, performed for a nuclear island design substantially similar to that shown in FIG. 1, in which the RWST (or plurality of RWSTs) has a capacity of about 350,000 gallons, the initial water level in the RWST is at an elevation of 95 feet, and the LOCA break is at a point 10 feet lower in elevation, i.e. at 85 feet. At 120° F., the water in the RWST has a density of 61.7 $lb/ft^3$ (pounds/cubit foot). At 15 psia, saturated water has a density of 59.8 $lb/ft^3$ and steam has a density of 0.038 $lb/ft^3$. If the ECC inlet to the vessel (that is, the inlet of the injection line 66 to the pressure vessel 14 in illustrative FIG. 1) has an elevation of 31 feet and an average quality of 1% (that is, the water flowing in from the RWST is almost purely water with little or no steam content), then the density inside the reactor would be 3.58 $lb/ft^3$. In this case, the water level in the RWST would need to drop to an elevation of about 34 ft (which is 7 feet below the bottom of the RWST in some contemplated embodiments) in order to reach an equilibrium static head.

To compensate for this effect it is disclosed herein that the total quality in the central riser 36 (or other upward flow path of the circulating primary coolant) is reduced, or additional pressure drop is incorporated into the ECC injection system. Toward this end, a barrier mechanism, diagrammatically indicated in FIG. 1, is implemented to suppress the flow of liquid water in the central riser 36 (or other upward flow path of the circulating primary coolant) from passing upward to the LOCA break. The barrier may take the various forms, as described in the following. In some embodiments (described herein with reference to FIG. 2), the barrier comprises a modification of the pathways connecting the volume contained by the central riser 36 with the internal pressurizer volume 19. This approach forms the barrier as a direct physical barrier, i.e. a baffle or tortuous path that limits the flow of liquid water from the central riser 36 into the internal pressurizer 18. In some embodiments (described herein with reference to FIG. 3), the barrier comprises modifying the ECC system so that it injects water from the RWST 12 into the central riser 36 in a manner that tends to drive circulation in a direction opposing the primary coolant flow circuit F inside the pressure vessel 14. This forms the barrier indirectly, by slowing or even reversing the velocity of the primary coolant flow circuit F so as to limit the flow of liquid water from the central riser 36 into the internal pressurizer 18. In some embodiments (described herein with reference to FIG. 4), the barrier comprises providing bypass valves that divert a portion of the upward flow leg of the primary coolant flow circuit F from the central riser 36 into the downcomer annulus 38. This again forms the barrier indirectly, by reducing the volume of upward flow in the central riser 36 so as to limit the flow of liquid water from the central riser 36 into the internal pressurizer 18. It will be appreciated that these mechanisms are not mutually exclusive, and the barrier may comprise a combination of two or more of these mechanisms or variants thereof.

In general, the amount of steam generated in the reactor vessel 14 after a LOCA is determined by the core decay heat. This cannot be altered by the designer without changing the power level of the plant. However, the quality in the riser 36 can be improved by increasing the flow of water within the riser, by constructing the pressure vessel 14 to be configured to entrain water with the steam. Toward this end, a flow path is provided with the barrier so as to separate the steam and water at the top of the reactor vessel 14 allowing the water to flow to the bottom of the pressure vessel 14 where it can be entrained with steam in the core again.

The high quality natural circulation path should interface with the pressurizer 18 in a way that allows the excess water to be separated and directed back to the bottom of the pressure vessel 14. However, this is difficult to achieve in the context of an integral pressurizer, because flow paths are designed to permit relatively free fluid communication between the volume contained in the central riser 36 and the volume 19 of the integral pressurizer 18.

Figure 2:
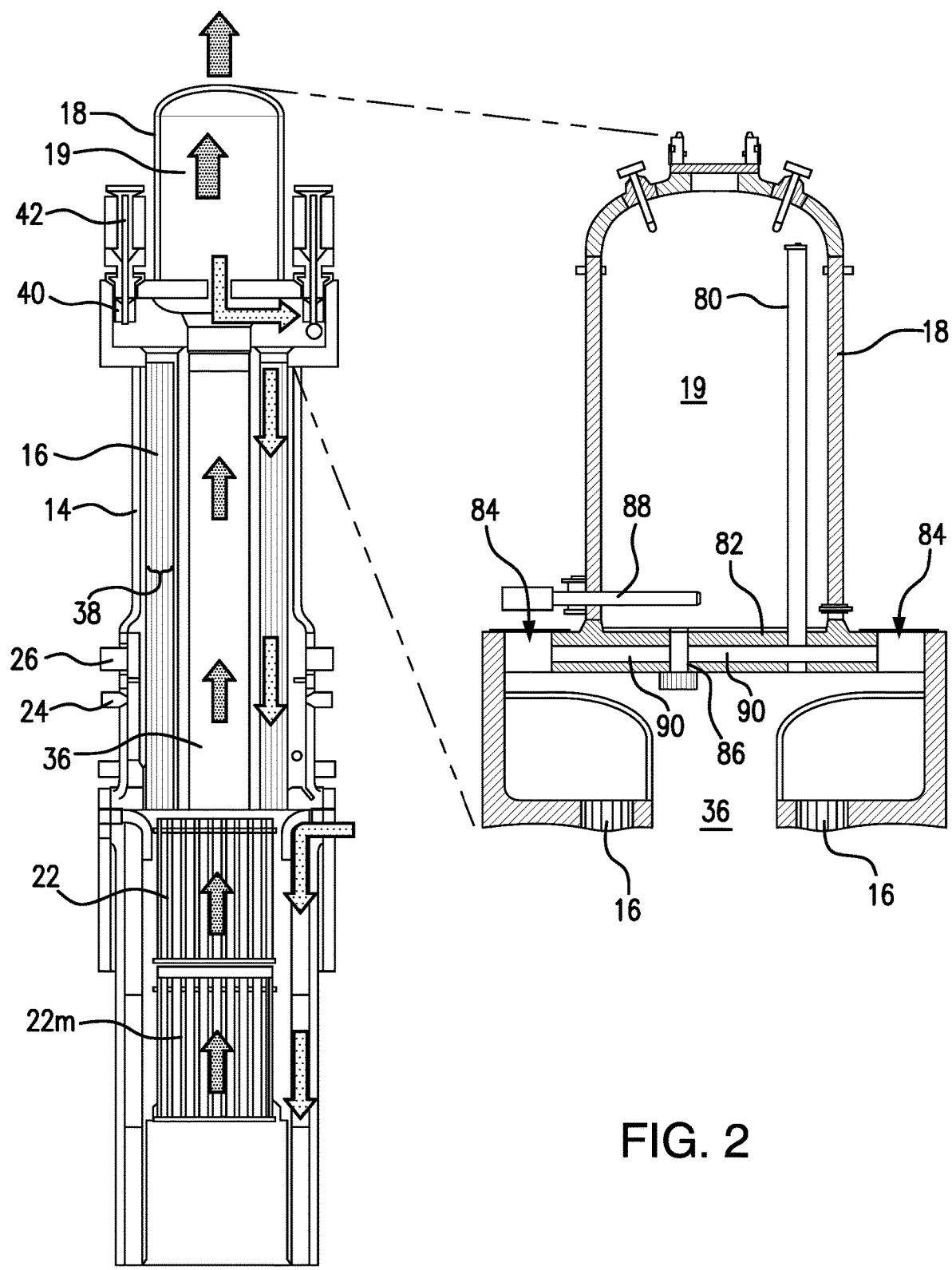
FIGS. 2-4 diagrammatically show illustrative embodiments of the mechanism for suppressing loss of liquid water through the LOCA break.

With reference to FIG. 2, and in particular the inset of FIG. 2, when the RWST 12 has sufficient driving head to fill the reactor vessel 14, two-phase flow rises and enters the pressurizer 18 through stand pipes 80 that extend through a pump support plate 82. (More generally, the stand pipes 80 pass through a plate separating the pressurizer space 19 from the remainder of the pressure vessel volume. Note that in the inset of FIG. 2 the illustrative RCPs 40, 42 are removed for clarity leaving mounting openings 84 in their place in the pump support plate 82. More generally, the RCPs may be located elsewhere, or may be omitted entirely in a natural circulation reactor.) The surge pipes 80 provide steam venting into the pressurizer space 19 during reactor depressurization. During normal operation, surge lines 86 are provided via which water passes, in a constricted manner e.g. by baffles or the like, to allow pressure in the pressurizer 18 and remainder of the pressure vessel 14 to reach an equilibrium. During normal operation, pressure control elements 88, e.g. resistive heaters, spargers, or the like, are operable to raise or lower the pressure in the pressurizer volume 19, with the surge lines 86 allowing these changes to transfer to the lower operational portion of the pressure vessel 14.

During depressurization, however, the surge lines 86 allow water collected in the pressurizer to drain out through the surge lines 86. This flow is directed into the rising two-phase steam/water flow rising up in the central riser 36. This prohibits a natural flow of the water, increasing the average quality within the riser.

In the embodiment of the barrier of FIG. 2, the pressurizer surge line 86 is modified to discharge along paths 90 that direct the water through the reactor coolant pumps and then down the tubes of the steam generators 16. (More generally, the modified surge lines 90 direct water outboard toward the downcomer annulus, and are also suitably employed in embodiments that do not employ RCPs or that locate RCPs elsewhere along the primary coolant flow circuit.) These modified paths 90 can be used during normal reactor operation as the surge lines, or can be opened by passive valves in response to an overpressure condition. In another alternative embodiment, the paths 90 are omitted and instead passive overpressure shutoff valves are installed on the surge lines 86 to close these lines off during ECC operation so that only the stand pipes 80 provide steam transport pathways into the pressurizer volume 90.

Figure 3:
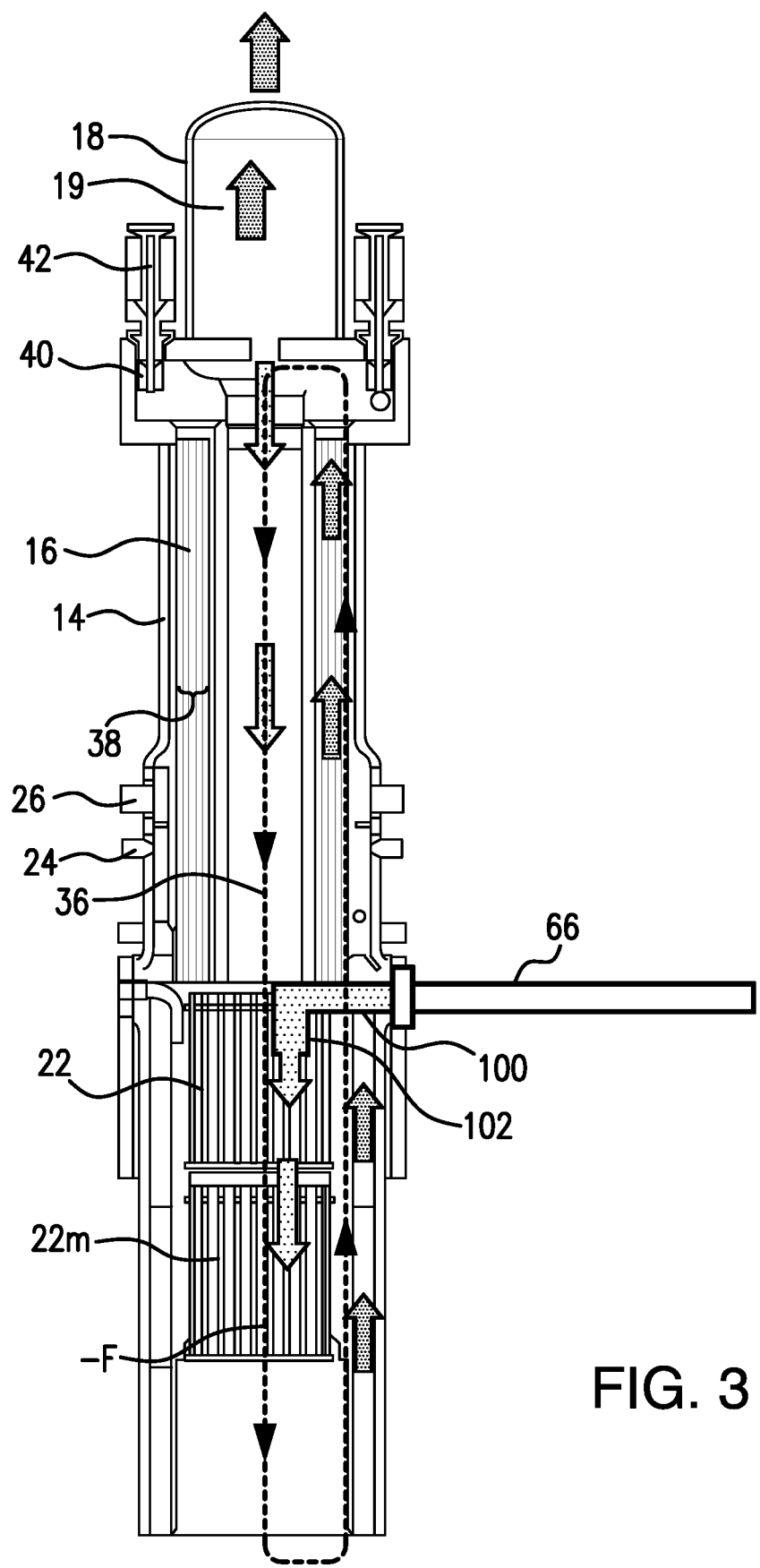

With reference to FIG. 3, in another embodiment of the barrier, the inlet of the injection line 66 to the pressure vessel 14, which conventionally feeds into the downcomer annulus 38, is modified by adding an extension pipe 100 so as to feed into the central riser 36. Optionally, the extension pipe 100 has a downwardly oriented outlet spigot 102 so as to direct the injected coolant from the RWST 12 downward. As diagrammatically indicated in FIG. 3, this tends to produce a coolant circulation flow -F oriented opposite to the direction from the primary coolant flow circuit F inside the pressure vessel 14 that is driven by the decay heat from the reactor core 20. In some embodiments, the magnitude of the counterflow -F is sufficient to actually reverse the direction of circulation in the pressure vessel 14, while in other embodiments the magnitude of the counterflow -F is less than that of the flow F, but is sufficient to slow the velocity of the flow F. The counterflow -F aligns with the discharge of water through the pressurizer, and thereby has the effect of reducing the flow of water into the pressurizer volume 19 driven by the upward current of the flow F in the central riser 36. The counterflow -F can be interrupted when ECC flow is sufficiently low, or if some heat removal is available through a remedial operational mode of the steam generator (in embodiments that include the internal steam generator 16).

Figure 4:
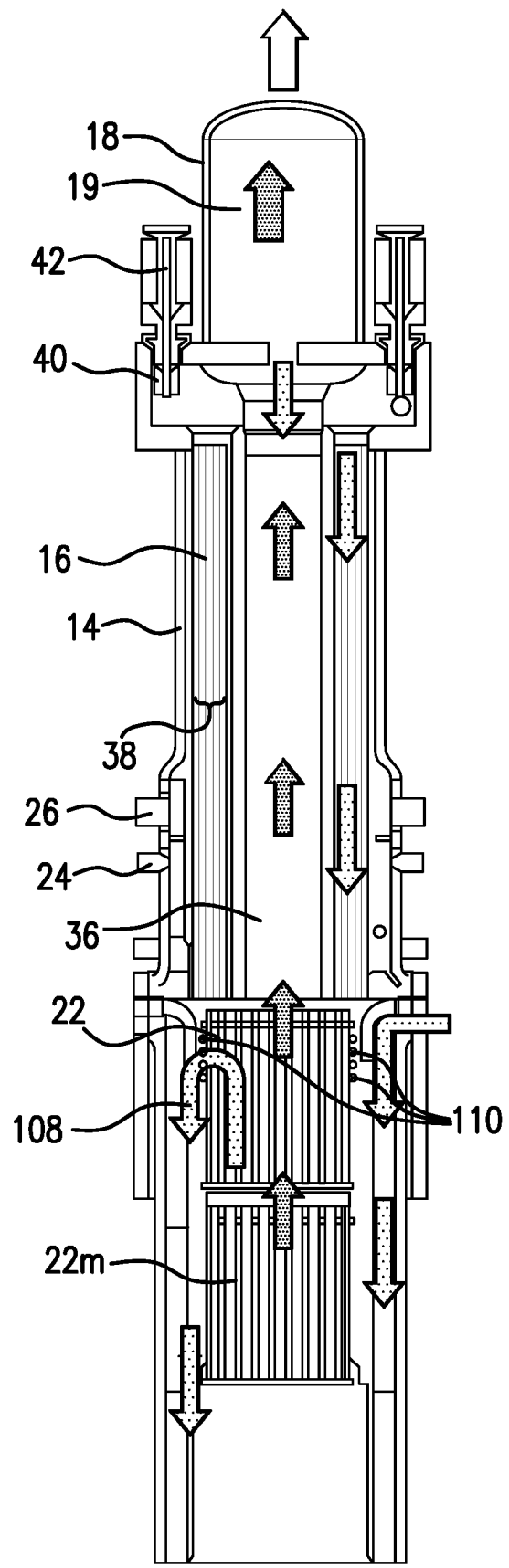

With reference to FIG. 4, in another embodiment of the barrier, a circulation pattern 108 is created using openings 110 in the core barrel (or other lower portion of the vessel central riser 36) so that a portion of the upward flow in the central riser 36 is shunted into the lower portion of the downcomer annulus 38 without passing upward into proximity with the pressurizer 18. The openings 110 can be holes, holes with flow diodes (i.e. check valves) or passively opened bypass valves to minimize normal bypass flow. This allows natural circulation flow 108 in the lower vessel. The flow 108 can be either in the normal direction (as illustrated) or in the reverse direction.

It is to be appreciated that the disclosed mechanisms for implementing the barrier 70 described with reference to FIGS. 2-4 are merely illustrative, and may be combined in various ways. As another illustrative example, if the RCPs are located in a lower portion of the pressure vessel such that they are submerged during the ECC operation, and if electrical drive power is available, then it is contemplated to implement the barrier at least in part by operating the RCPs in retrograde so as to provide the counterflow -F (see FIG. 3) in an active fashion. (Although such operation may be relatively inefficient since the impeller blades are not designed for retrograde operation, the RCPs are nonetheless expected to be capable of generating counterflow -F sufficient to usefully reduce flow of water out the LOCA break.) The disclosed barrier is effective for a pressurized water reactor (PWR) in the case of a LOCA break occurring at the top of the pressure vessel, e.g. in a vessel penetration into an integral pressurizer (as illustrated in FIGS. 1-4) or at piping between the top of the pressure vessel and an external pressurizer or at piping connecting at the top of such an externally pressurized vessel (variants not illustrated). As used herein, phraseology such as "top of the pressure vessel" is intended to encompass any break in a vessel penetration into the integral pressurizer 18 that is large enough to constitute a LOCA (that is, any break in a pipe of diameter greater than 1.8-inch). In the case of an externally pressurized vessel (that is, a pressure vessel that is pressurized using an external pressurizer connected via piping), "top of the pressure vessel" is intended to encompass any break large enough to constitute a LOCA in a vessel penetration at an elevation high enough to be located above the primary coolant circuit in the pressure vessel. Still further, while integral PWR systems in which steam generators 16 are disposed inside the pressure vessel 14 are illustrated, it is contemplated to employ the disclosed embodiments of the barrier in PWR systems that utilize external steam generators.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus comprising:
a pressurized water reactor (PWR) comprising a pressure vessel containing a nuclear reactor core comprising fissile material;
a central riser disposed inside the pressure vessel and defining a coolant circulation path in which coolant water heated by the nuclear reactor core flows upward inside the central riser, exits a top opening of the central riser, and flows downward in a downcomer annulus defined between the central riser and the pressure vessel to return to the nuclear reactor core;
a radiological containment structure inside of which the PWR is disposed;
an emergency core cooling system configured to drain water from a body of water through an injection line into the pressure vessel in response to a vessel penetration break at the top of the pressure vessel that depressurizes the pressure vessel; and
an extension of the injection line disposed inside the pressure vessel and passing through the central riser, the extension configured to operate concurrently with the emergency core cooling system to suppress flow of liquid water from the pressure vessel out the vessel penetration break at the top of the pressure vessel.

2. The apparatus of claim 1 wherein the extension of the injection line includes a downwardly oriented outlet spigot disposed inside the central riser.

3. The apparatus of claim 1 wherein the body of water comprises a refueling water storage tank (RWST) disposed with the PWR in the radiological containment.

4. The apparatus of claim 3 wherein the emergency core cooling system further includes:
a pressurized water injection tank configured to inject pressurized water into the pressure vessel during depressurization of the pressure vessel;
wherein the injection line is configured to drain water from the RWST into the pressure vessel after the depressurization of the pressure vessel.

5. The apparatus of claim 1 wherein the PWR further comprises an integral pressurizer defining a pressurizer volume at the top of the pressure vessel, the integral pressurizer including pressure control elements operable to control pressure in the pressurizer volume.

6. The apparatus of claim 1 further comprising:
openings in a lower portion of the central riser arranged to shunt a portion of the upward flow in the central riser into a lower portion of the downcomer annulus.

7. The apparatus of claim 1 wherein:
an integral pressurizer defining a pressurizer volume at the top of the pressure vessel and including pressure control elements operable to control pressure in the pressurizer volume; and
a surge line configured to provide fluid communication between the pressurizer volume at the top of the pressure vessel and the remainder of the pressure vessel, the surge line configured to direct water outboard toward the downcomer annulus.

* * * * *